US008627996B2

(12) United States Patent
Patrikios

(10) Patent No.: US 8,627,996 B2
(45) Date of Patent: Jan. 14, 2014

(54) SYSTEM AND METHOD FOR TERMINATING ALUMINUM CONDUCTORS

(75) Inventor: Mike Patrikios, Milford, CT (US)

(73) Assignee: Sonics & Materials Inc., Newtown, CT (US)

( * ) Notice: Subject to any disclaimer, the term of this patent is extended or adjusted under 35 U.S.C. 154(b) by 225 days.

(21) Appl. No.: 13/267,316

(22) Filed: Oct. 6, 2011

(65) Prior Publication Data

US 2012/0111629 A1 May 10, 2012

Related U.S. Application Data

(60) Provisional application No. 61/390,460, filed on Oct. 6, 2010.

(51) Int. Cl.
*B23K 1/06* (2006.01)
*B23K 20/10* (2006.01)

(52) U.S. Cl.
USPC .................................... 228/110.1; 228/180.5

(58) Field of Classification Search
None
See application file for complete search history.

(56) References Cited

U.S. PATENT DOCUMENTS

| | | | | |
|---|---|---|---|---|
| 3,717,842 | A | 2/1973 | Douglas, Jr. | |
| 4,139,140 | A | 2/1979 | Stockel | |
| 4,545,519 | A | 10/1985 | Renshaw et al. | |
| 4,817,814 | A * | 4/1989 | Coto et al. | 228/110.1 |
| 5,857,259 | A | 1/1999 | Johnston | |
| 6,142,838 | A | 11/2000 | Shinchi | |
| 6,273,322 | B1 | 8/2001 | Yamamoto et al. | |
| 6,476,324 | B1 | 11/2002 | Ide et al. | |
| 6,538,203 | B1 | 3/2003 | Nolle et al. | |
| 6,573,454 | B2 | 6/2003 | Fujiwara | |
| 7,374,466 | B2 | 5/2008 | Onuma et al. | |
| 2002/0162683 | A1 * | 11/2002 | Fujiwara | 174/74 R |
| 2004/0157504 | A1 | 8/2004 | Fujimoto et al. | |
| 2008/0194127 | A1 | 8/2008 | Stracke et al. | |
| 2009/0218134 | A1 * | 9/2009 | Stroh et al. | 174/74 R |
| 2009/0229880 | A1 | 9/2009 | Watanabe | |
| 2010/0003867 | A1 * | 1/2010 | Lehmann et al. | 439/874 |
| 2010/0170935 | A1 * | 7/2010 | Stroh et al. | 228/110.1 |
| 2011/0048763 | A1 * | 3/2011 | Schloms et al. | 174/90 |
| 2011/0198122 | A1 * | 8/2011 | Sagawa et al. | 174/84 R |

FOREIGN PATENT DOCUMENTS

| | | | | |
|---|---|---|---|---|
| JP | 2003-338330 | A | * | 11/2003 |
| JP | 2006-024523 | A | * | 1/2006 |
| JP | 2007-012329 | A | * | 1/2007 |
| JP | 2007-305355 | A | * | 11/2007 |
| JP | 2007305314 | A | | 11/2007 |
| JP | 2009-009736 | A | * | 1/2009 |
| JP | 2009-231079 | A | * | 10/2009 |

OTHER PUBLICATIONS

International Search Report and Written Opinion of the International Searching Authority; Application No. PCT/US2011/055089; Issued: Jan. 24, 2012; Mailing Date: Feb. 3, 2012; 6 pages.

* cited by examiner

*Primary Examiner* — Kiley Stoner
(74) *Attorney, Agent, or Firm* — St. Onge Steward Johnston & Reens LLC

(57) ABSTRACT

A system and method for terminating a wire having an aluminum conductor includes a terminal having a conductor receiving area adapted to receive the aluminum conductor, and a welding buffer sized and shaped to fit within the conductor receiving area of the terminal with the aluminum conductor disposed between the welding buffer and the terminal. The terminal, the welding buffer and the aluminum conductor are ultrasonically welded together to form an integrated unit, such that the welding buffer forms a part of a finished terminated wire assembly.

10 Claims, 3 Drawing Sheets

SYSTEM AND METHOD FOR TERMINATING ALUMINUM CONDUCTORS

CROSS-REFERENCE TO RELATED APPLICATIONS

This patent application claims the benefit, under 35 U.S.C. §119(e), of U.S. Provisional Patent Application Ser. No. 61/390,460, filed on Oct. 6, 2010, which is hereby incorporated by reference herein.

FIELD OF THE INVENTION

The present invention relates generally to the ultrasonic welding of an aluminum conductor, and more specifically, relates to ultrasonically welding a terminal to an aluminum conductor using a buffer material.

BACKGROUND OF THE INVENTION

The use of aluminum conductor wire in electrical circuits has many advantages over previously used copper conductors. An aluminum conductor is significantly lower in cost and substantially lighter in weight than copper conductors. The difficulty with aluminum conductors is providing a reliable means of terminating or interconnecting the conductor. Aluminum will cold flow over time; cold flow being the permanent deformation of the material under cold (i.e., non-elevated) temperatures. As a result, the cold flow of the aluminum interconnect will loosen a mechanical connection such as a crimp or screw-type terminal. The loosened connection increases the joint resistance which, in turn, generates heat that can accelerate the cold flow of the aluminum joint, causing a cycle of more heat, and more cold flow of the aluminum. Moisture can also enter the joint between the aluminum conductor and the typically non-aluminum terminal connection and start galvanic corrosion between the dissimilar metals and ultimately the terminal connection can fail. This, in turn, raises the overall cost of aluminum as a conductor since the conductor either needs to be re-terminated, or a completely new conductor needs to be used.

Ultrasonic welding has proven to be a reliable and permanent method of welding aluminum to copper, for example, and can be used to solve the termination problems with aluminum cables. The difficulty with ultrasonic welding of aluminum is the tendency of aluminum to eventually stick to the ultrasonic tooling. Using a standard ultrasonic welding system, the aluminum from the aluminum conductor eventually accumulates onto the welding tool. This degrades any future welds using the ultrasonic tool until the aluminum can be removed. In many cases, the aluminum cannot be removed, and a brand new ultrasonic welding tip must be introduced to continue the welding process. This can cause a significant increase in the expense of ultrasonic welding, along with a significant loss of welding time when the machine is down for repair or replacement.

U.S. Pat. No. 6,476,324 attempts to overcome this problem by pinching the conductor, covered with resin-made covers, and pinching it together between resinous chips. The wires are then pressurized, heated, and ultrasonically welded. The result is the resin bonding with the resinous chips. This solution, however, prevents a seamless conduction between the conductor and the terminal as there is a resinous layer in between. Furthermore, the conductor needs to be pre-coated with the resin, adding both time and materials prior to the welding process.

U.S. Pat. No. 4,545,519 attempts to overcome this problem by providing a shim material between the welding tip and the work piece to be ultrasonically welded. The shim material is made from a relatively hard material, creating a very low tensile strength bonding between the work piece and the shim material. After the ultrasonic weld, the shim material is broken off and separated from the work piece. This solution, however, adds extra time, and wastes material for each weld. After each weld, the system must physically remove the shim material from the work piece. Furthermore, while the tensile strength bonding between the shim material and the work piece is very low, there is still the potential for the removal of the shim material to either leave behind some shim material, or damage the conductor in the process.

What is desired, therefore, is a system and method of ultrasonically welding an aluminum wire to a terminal that prevents the aluminum from the aluminum conductor from accumulating on the ultrasonic welding tool, is inexpensive, and does not interfere with the welding process.

SUMMARY OF THE INVENTION

Accordingly, it is an object of the present invention to provide a system and method of ultrasonically welding an aluminum wire to a terminal that prevents the aluminum from the aluminum conductor from accumulating on the ultrasonic welding tool.

Another object of the present invention is to provide a system and method of ultrasonically welding an aluminum wire to a terminal having the above characteristics and that is relatively inexpensive as compared to prior known ultrasonic welding processes.

Another object of the present invention is to provide a system and method of ultrasonically welding an aluminum wire to a terminal having the above characteristics and that provides a strong weld between the aluminum wire and the terminal.

These and other objects of the present invention are achieved in accordance with one aspect of the invention by provision of a system for terminating a wire having an aluminum conductor, the system including a terminal having a conductor receiving area adapted to receive the aluminum conductor, and a welding buffer sized and shaped to fit within the conductor receiving area of the terminal with the aluminum conductor disposed between the welding buffer and the terminal. The terminal, the welding buffer and the aluminum conductor are ultrasonically welded together to form an integrated unit, whereby the welding buffer forms a part of a finished terminated wire assembly.

In some embodiments, the terminal is formed from a copper alloy. In certain of these embodiments, the terminal consists essentially of brass. In some embodiments, the welding buffer is formed from a copper alloy. In certain of these embodiments, the welding buffer consists essentially of brass.

In some embodiments, the terminal comprises a bottom wall and two side walls extending from opposite edges of the bottom wall, the side walls being generally parallel to one another and being generally orthogonal to the bottom wall, the side walls and the bottom wall defining the conductor receiving area, and the welding buffer has a generally rectangular shape. In certain of these embodiments, the side walls have a distance therebetween and the welding buffer has a width slightly larger than the distance between the side walls, such that an interference fit is created between the terminal and the welding buffer, so that the aluminum conductor is held in place between the terminal and the welding buffer by the friction fit in order to aid in positioning within an ultrasonic welder before welding.

In some embodiments, the welding buffer comprises a thin sheet material. In certain of these embodiments, the welding buffer is cut from a coil of sheet material before being disposed within the conductor receiving area of the terminal. In some embodiments, the wire comprises a shielding material along a length thereof other than in an area where the aluminum conductor is received in the conductor receiving area of the terminal.

In accordance with another aspect of the present invention, a method for terminating a wire having an aluminum conductor includes the steps of: (i) providing a terminal having a conductor receiving area adapted to receive the aluminum conductor; (ii) disposing a welding buffer sized and shaped to fit within the conductor receiving area of the terminal within the conductor receiving area of the terminal with the aluminum conductor disposed between the welding buffer and the terminal; and (iii) ultrasonically welding together the terminal, the welding buffer and the aluminum conductor to form an integrated unit, whereby the welding buffer forms a part of a finished terminated wire assembly.

In some embodiments, the terminal is formed from a copper alloy. In certain of these embodiments, the terminal consists essentially of brass. In some embodiments, the welding buffer is formed from a copper alloy. In certain of these embodiments, the welding buffer consists essentially of brass.

In some embodiments, the terminal comprises a bottom wall and two side walls extending from opposite edges of the bottom wall, the side walls being generally parallel to one another and being generally orthogonal to the bottom wall, the side walls and the bottom wall defining the conductor receiving area; and the welding buffer has a generally rectangular shape. In certain of these embodiments, the side walls have a distance therebetween and the welding buffer has a width slightly larger than the distance between the side walls, such that an interference fit is created between the terminal and the welding buffer, so that the aluminum conductor is held in place between the terminal and the welding buffer by the friction fit in order to aid in positioning within an ultrasonic welder before welding.

In some embodiments, the welding buffer comprises a thin sheet material. In certain of these embodiments, the method further includes the step of cutting the welding buffer from a coil of sheet material before disposing the welding buffer within the conductor receiving area of the terminal. In some embodiments, the wire comprises a shielding material along a length thereof, and the method further includes the step of stripping the shielding material from an area where the aluminum conductor is received in the conductor receiving area of the terminal.

DETAILED DESCRIPTION OF THE INVENTION

The system and method of terminating an aluminum wire of the present invention generally employs an aluminum conductor, a connecting terminal, a buffer material, and an ultrasonic welder.

Figure 1:
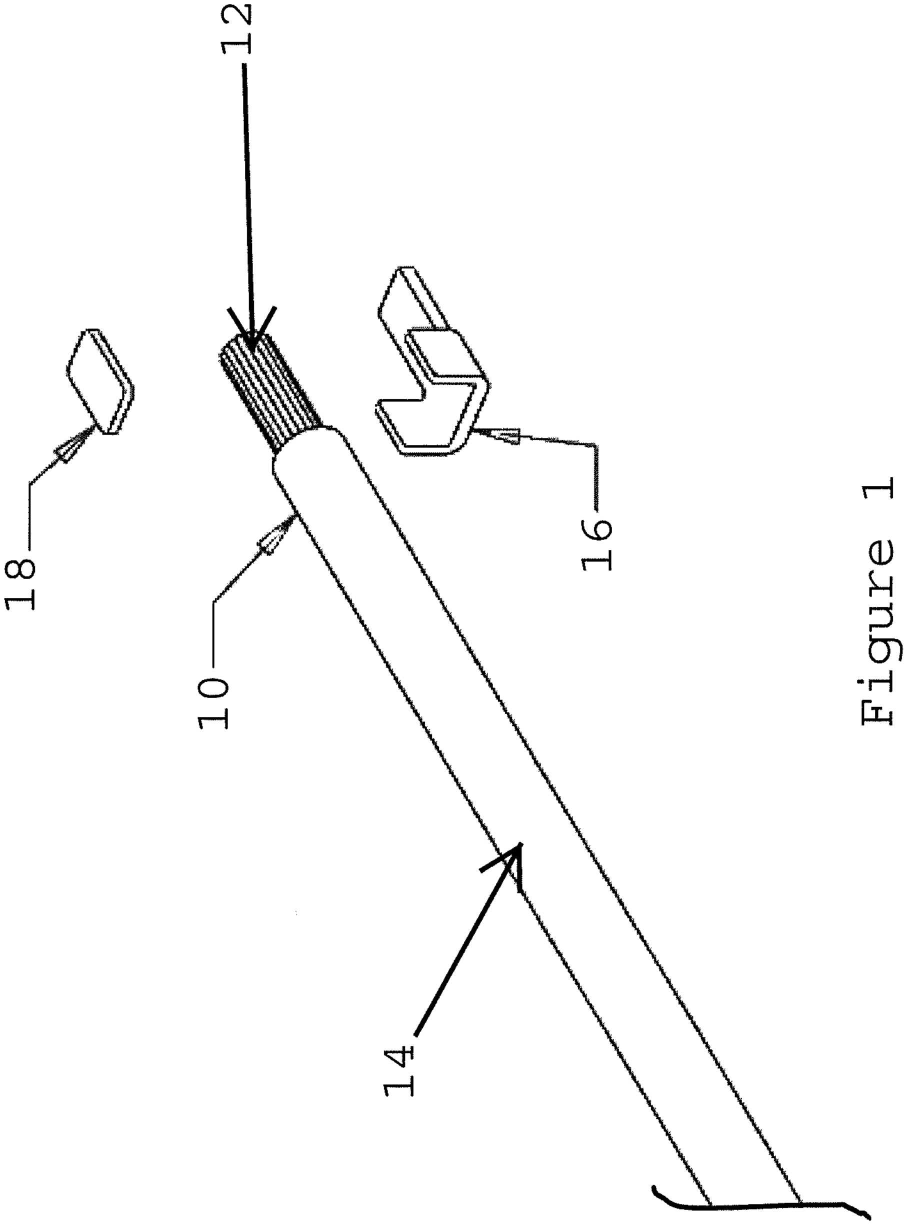
FIG. 1 illustrates the components of an exemplary aluminum conductor termination before the components are brought together.

As best seen in FIG. 1, a wire (10) may contain an aluminum conductor (12) housed inside of a shielding or insulator (14) which runs the entire length of the wire. A small portion of the shielding (14) may be removed from the end of the cable, exposing a small portion of the aluminum conductor (12) be used in the termination of the conductor (12). This exposed portion of aluminum conductor (12) is used to weld to the terminal (16).

The terminal (16) may be made from brass or copper alloys, or any other material of suitable conductivity and strength. The terminal (16) may also be U-shaped such that the exposed aluminum conductor (12) portion, being generally of a circular shape, may be easily inserted into the terminal (16). However, the aluminum conductor (12) and/or the wire (10) may be of any geometric shape, and the terminal (16) may be designed to fit the geometric shape of the aluminum conductor (12).

Preferably the welding buffer (18) is of a rectangular shape, particularly when the terminal (16) is configured to have a generally U-shape, and is made of a thin material such that it can be paid out from a continuous coil of welding buffer material. The welding buffer (18) can then be cut to any length depending on the size of the exposed aluminum conductor (12) and the size of the terminal (16).

Figure 2:
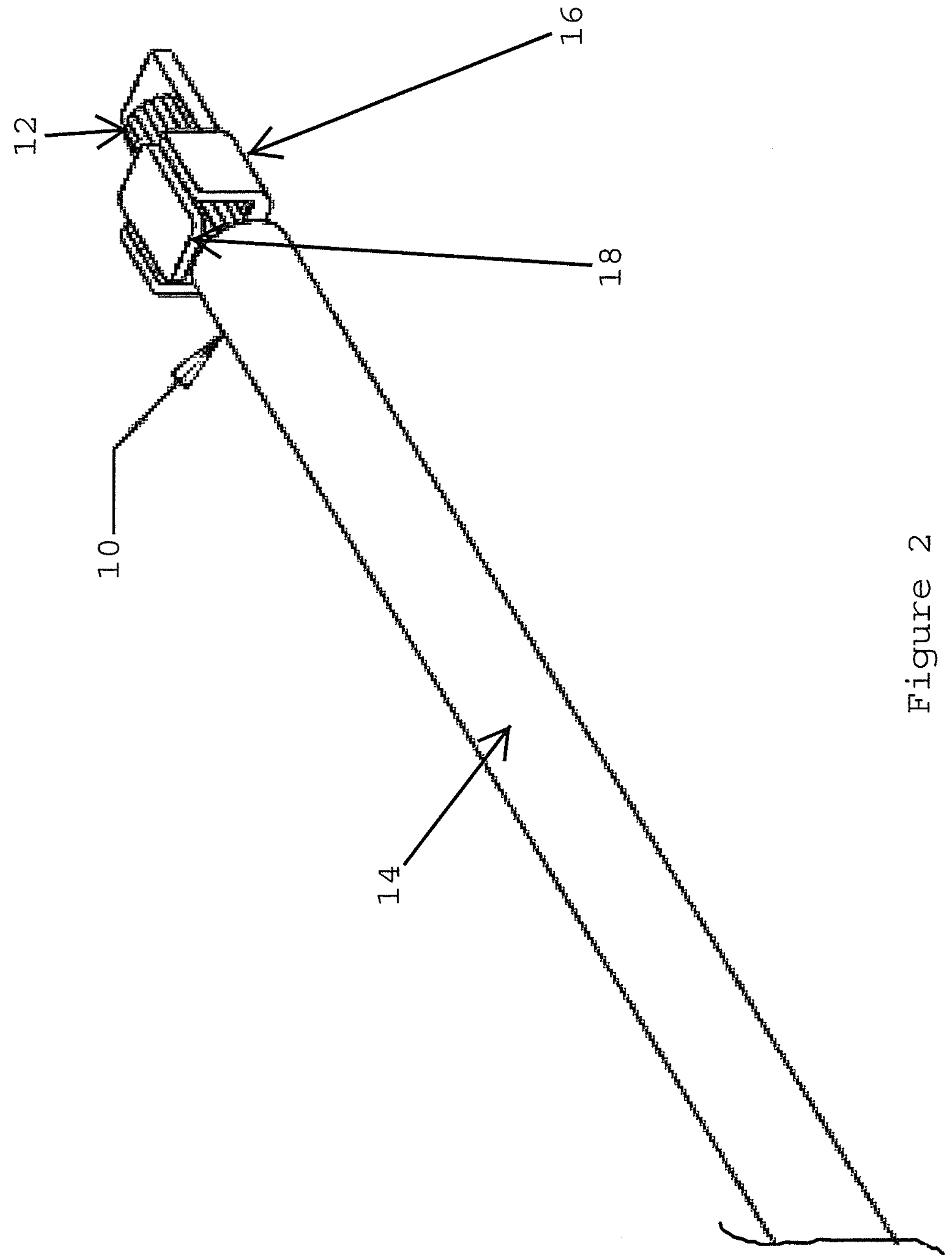
FIG. 2 illustrates the components of the exemplary aluminum conductor termination of FIG. 1 after the components are brought together, but before ultrasonic welding occurs.

As best seen in FIG. 2, the exposed aluminum conductor (12) is placed into the terminal (16) such that substantially no portion of the shielding (14) is inside the U-shape of the terminal (16). This forms a better seal and prevents any shielding, which is insulated, from interfering in the transfer of the electrical signal between the aluminum conductor (12) and the terminal (16). After the aluminum conductor (12) is placed inside the terminal (16), a welding buffer (18) is placed over the aluminum conductor (12). The welding buffer (18) is placed on top of the aluminum conductor (12) and is preferably sized to fit snugly inside the terminal (16), i.e., the welding buffer (18) has a width substantially to a width of a conductor-receiving recess defined by the terminal (16).

Figure 3:
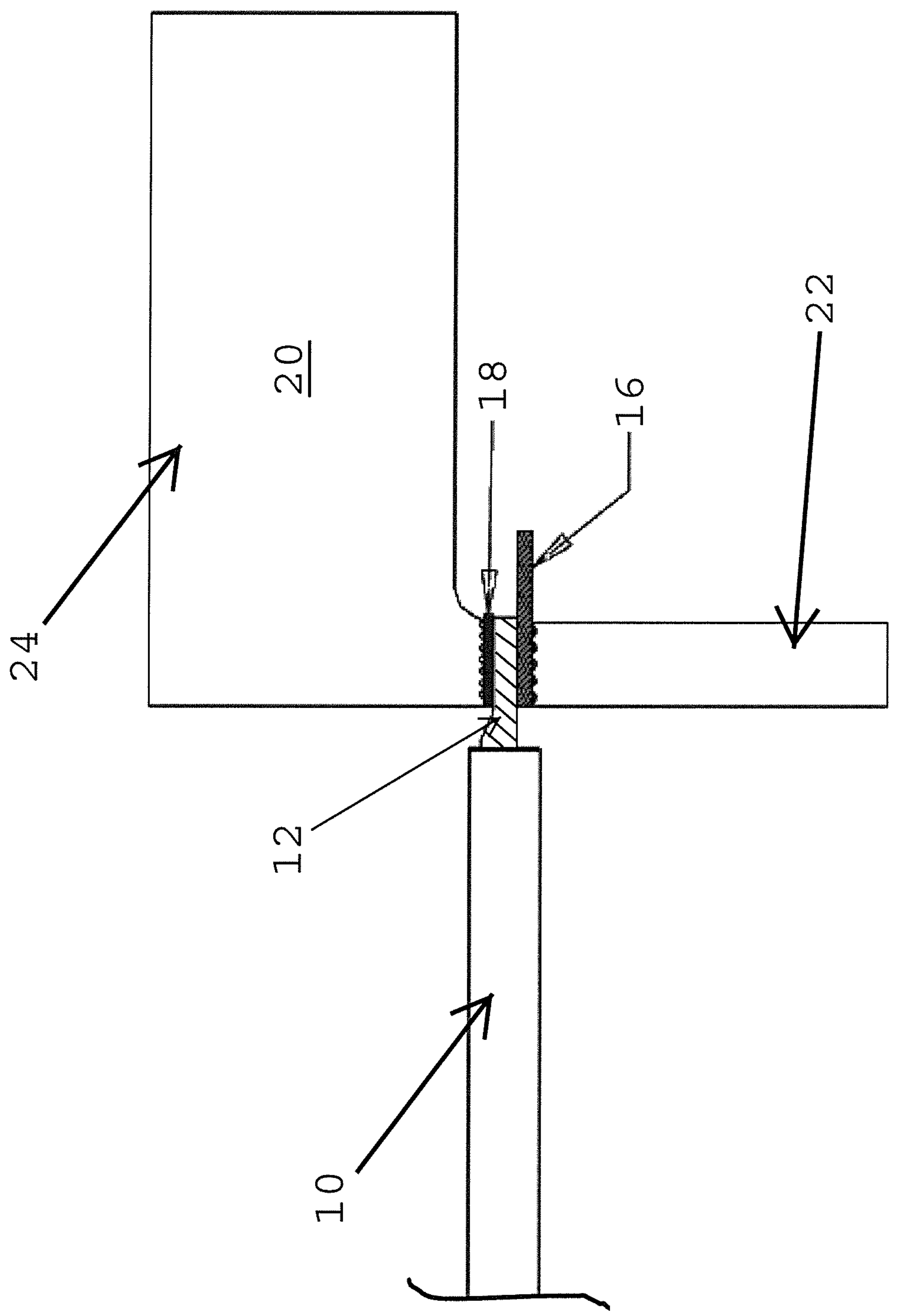
FIG. 3 illustrates the components of the exemplary aluminum conductor termination of FIG. 1 during an ultrasonic welding process.

As best seen in FIG. 3, the wire (10), including the weld buffer (18) and the terminal (16), is placed inside of an ultrasonic welding tool (20). The terminal (16) and the welding buffer (18) may be attached to the aluminum conductor (12) prior to being inserted into the ultrasonic welding tool (20), for example, through use of an interference fit to hold the terminal (16) and the welding buffer (18) on to the aluminum conductor (12). In other embodiments, the shielding (14) may be removed from the wire (10), exposing the aluminum conductor (12), and the exposed aluminum conductor (12) may be placed directly into the ultrasonic welding tool (20). Prior to the insertion, the terminal (16) and the welding buffer (18) may have been placed inside the ultrasonic welding tool (20).

To weld the terminal (16) and the welding buffer (18) to the aluminum conductor (12), the entire apparatus is placed inside the ultrasonic welding tool (20), on top of an ultrasonic anvil (22). The ultrasonic welding tool (20) is activated, thereby supplying ultrasonic energy to a horn (24) in the conventional manner, and the horn (24) and anvil (22) are compressed toward one another thereby welding the terminal (16), the aluminum conductor (12), and the welding buffer together (18). The wire (10) is then removed from the ultrasonic welding tool (20), with the terminal (16) and the welding buffer (18) attached, and a new wire (10) may be inserted into the ultrasonic welding tool (20) for further welds.

This system and method has the advantage in that no aluminum accumulates on the ultrasonic welding tool, as the welding buffer is made from a material other than pure aluminum. Furthermore, as the welding buffer is attached to the aluminum conductor and the terminal, the welding buffer does not need to be manually removed from the ultrasonic welding tool after each weld, such as the case in the prior art. The buffer material adds very little cost to each welded terminal, as the buffer is sized perfectly to fit inside the terminal, and is made of a very thin material. There is also no added time to the overall welding process as the ultrasonic welding tool does not require more time to weld with the presence of a welding buffer.

It should be appreciated by those skilled in the art that various changes and modifications can be made to the illustrated embodiments without departing from the spirit of the present invention. All such modifications and changes are intended to be covered within the scope of the present invention disclosure.

What is claimed is:

1. A method for terminating a wire having an aluminum conductor, said method comprising the steps of:

providing a terminal having a conductor receiving area adapted to receive the aluminum conductor;

disposing a welding buffer being separate from said aluminum conductor, the welding buffer being sized and shaped to fit within the conductor receiving area of said terminal within the conductor receiving area of said terminal with the aluminum conductor disposed between the welding buffer and the terminal; and ultrasonically welding together the terminal, the welding buffer and the aluminum conductor to form an integrated unit, whereby the welding buffer forms a part of a finished terminated wire assembly.

2. The method of claim 1 wherein the terminal is formed from a copper alloy.

3. The method of claim 2 wherein the terminal consists essentially of brass.

4. The method of claim 1 wherein the welding buffer is formed from a copper alloy.

5. The method of claim 4 wherein the welding buffer consists essentially of brass.

6. The method of claim 1:

wherein the terminal comprises a bottom wall and two side walls extending from opposite edges of the bottom wall, the side walls being generally parallel to one another and being generally orthogonal to the bottom wall, the side walls and the bottom wall defining the conductor receiving area; and wherein the welding buffer has a generally rectangular shape.

7. The method of claim 6 wherein the side walls have a distance therebetween and wherein the welding buffer has a width slightly larger than the distance between the side walls, such that an interference fit is created between the terminal and the welding buffer, so that the aluminum conductor is held in place between the terminal and the welding buffer by the friction fit in order to aid in positioning within an ultrasonic welder before welding.

8. The method of claim 1 wherein the welding buffer comprises a thin sheet material.

9. The method of claim 8 further comprising the step of cutting the welding buffer from a coil of sheet material before disposing the welding buffer within the conductor receiving area of the terminal.

10. The method of claim 1 wherein the wire comprises a shielding material along a length thereof, and further comprising the step of stripping the shielding material from an area where the aluminum conductor is received in the conductor receiving area of the terminal.

* * * * *